US010146101B2

(12) United States Patent
Lundberg et al.

(10) Patent No.: US 10,146,101 B2
(45) Date of Patent: Dec. 4, 2018

(54) METHOD FOR SEQUENTIAL CONTROL OF IR-FILTER, AND AN ASSEMBLY PERFORMING SUCH METHOD

(71) Applicant: AXIS AB, Lund (SE)

(72) Inventors: Stefan Lundberg, Lund (SE); Jonas Hjelmström, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/857,077

(22) Filed: Dec. 28, 2017

(65) Prior Publication Data
US 2018/0188634 A1    Jul. 5, 2018

(30) Foreign Application Priority Data
Dec. 28, 2016    (EP) ..................... 16207122

(51) Int. Cl.
*G03B 7/091*    (2006.01)
*G03B 9/06*    (2006.01)
(Continued)

(52) U.S. Cl.
CPC .............. *G03B 7/091* (2013.01); *G03B 7/00* (2013.01); *G03B 7/095* (2013.01); *G03B 9/00* (2013.01); *G03B 9/06* (2013.01); *G03B 11/00* (2013.01)

(58) Field of Classification Search
CPC ...................................... G03B 7/091
See application file for complete search history.

(56) References Cited

U.S. PATENT DOCUMENTS 6,642,955 B1    11/2003    Midgley et al.
7,936,986 B2 *    5/2011    Ichimiya ................. G03B 13/36
                                                                  396/98

(Continued)

FOREIGN PATENT DOCUMENTS

CN    101064778 A    10/2007
JP    3086673 U    9/1991
(Continued)

OTHER PUBLICATIONS

EP 16207122.9 European Search Report (dated Apr. 7, 2017).
(Continued)

*Primary Examiner* — Clayton E. LaBalle
*Assistant Examiner* — Dennis Hancock
(74) *Attorney, Agent, or Firm* — Volpe and Koenig, P.C.

(57) ABSTRACT

A method for sequential control of a diaphragm arrangement of a camera, the arrangement comprising a diaphragm, and an integrated IR cut filter always covering at least a portion of an aperture opening of the diaphragm, comprising: initiating closing or opening of the diaphragm; detecting an amount of incident radiation when the diaphragm has an initial aperture opening; shifting the aperture opening to an intermediate aperture opening to alter the ratio between visible light and infrared radiation passing the diaphragm; detecting an amount of incident radiation following the shift; calculating a composition of visual light and infrared radiation in the scene from the detected amounts of incident radiation and a calculated ratio between visible light and infrared radiation when having the initial aperture opening and the intermediate aperture opening, respectively; and shifting the aperture opening of the diaphragm to a new position.

13 Claims, 4 Drawing Sheets

(51) Int. Cl.
*G03B 7/00* (2014.01)
*G03B 7/095* (2006.01)
*G03B 9/00* (2006.01)
*G03B 11/00* (2006.01)

(56) References Cited

U.S. PATENT DOCUMENTS

| | | | |
|---|---|---|---|
| 9,420,164 | B1 | 8/2016 | Galor Gluskin et al. |
| 2002/0001464 | A1* | 1/2002 | Ohsawa ............. G03B 7/09979 396/50 |
| 2002/0003583 | A1 | 1/2002 | Arai |
| 2002/0044212 | A1 | 4/2002 | Hashimoto |
| 2005/0008358 | A1 | 1/2005 | Kanome et al. |
| 2010/0102366 | A1 | 4/2010 | Lee et al. |
| 2011/0228145 | A1 | 9/2011 | Kimura |
| 2011/0228399 | A1 | 9/2011 | Ohnishi |
| 2012/0026325 | A1 | 2/2012 | Bunker et al. |
| 2012/0087645 | A1 | 4/2012 | Wu et al. |
| 2013/0222603 | A1 | 8/2013 | Agranov et al. |
| 2015/0062422 | A1 | 3/2015 | Stern |
| 2015/0357364 | A1 | 12/2015 | Kim |
| 2015/0381907 | A1 | 12/2015 | Boettiger et al. |
| 2016/0127659 | A1 | 5/2016 | Kawasaki |
| 2016/0172399 | A1 | 6/2016 | Nakata |
| 2017/0187948 | A1 | 6/2017 | Wang |
| 2017/0208261 | A1* | 7/2017 | Kobayashi ................ G01J 1/02 |

FOREIGN PATENT DOCUMENTS

| | | |
|---|---|---|
| JP | 10171026 A | 12/1996 |
| JP | 2001-036807 A | 2/2001 |
| JP | 2002-189238 A | 7/2002 |
| JP | 2003-264842 A | 9/2003 |
| JP | 2004341137 A | 12/2004 |
| JP | 2006-078666 A | 3/2006 |
| JP | 2006-78666 A | 3/2006 |
| JP | 2006-157413 A | 6/2006 |
| WO | 2011/101036 A1 | 8/2011 |
| WO | 2012/018047 A1 | 2/2012 |

OTHER PUBLICATIONS

EP 17209246.2 Extended European Search Report (dated May 7, 2018).

EP 16207126.0 European Search Report (dated May 11, 2017).

EP 17178716.1 European Search Report (dated Dec. 7, 2017).

* cited by examiner

METHOD FOR SEQUENTIAL CONTROL OF IR-FILTER, AND AN ASSEMBLY PERFORMING SUCH METHOD

FIELD OF INVENTION

The present teachings relate to controlling infrared (IR) filters for cameras. In particular, the present teachings relate to controlling an IR cut filter integrated in a diaphragm of a camera lens system.

BACKGROUND

The use of infrared (IR) filters for cameras is well known in the art, and in particular in relation to digital cameras. In short, the image sensor of the camera has a spectral response with a non-negligible component in the infrared. This results in opportunities as well as challenges. An opportunity lies in that in low-light conditions the IR-component may provide useful information about the imaged scene, information which may be enhanced even further by means of an IR light source. A challenge is found during day-time imaging, where the addition of an IR-component will distort the color balance in the image, and it may also saturate the image sensor completely.

A way of maintaining the beneficial effects while suppressing the less beneficial effects is to add a movable IR-cut filter in the beam path in front of the image sensor. In this way, the IR (cut) filter may be used during daylight conditions, enabling acquisition of color images. Through-out the application "IR-cut filter" and "IR-filter" may be used interchangeably, and unless explicitly stated "IR-filter" will in the present context correspond to an IR-cut filter. Pixels of the image sensor will then operate in a first manner, where the incident light is divided into colors and detected as a charge on individual photodetectors thus enabling color separation. During night time, or in low-light conditions the IR filter may be removed and use is made of the resulting increase in incoming radiation from the IR portion of the spectrum. The IR radiation will not contain any color information, and instead of performing a color separation, the only parameter is the intensity of the incoming radiation, which may be presented as a black and white intensity image (or with any desirable color scale). The addition of an IR light source may enhance the image even further.

An auxiliary spectral sensor may be used for controlling when to insert and when to remove the IR-filter, such that when the level of ambient light becomes too low, the camera switches to night mode by removing the IR filter and optionally using an IR light source, either carried by or incorporated in the camera, or arranged externally thereof.

In the straightforward solution, an IR-cut filter is arranged in front of the sensor, and an actuator is used for moving the filter between a position in which it completely covers the sensor ('day-mode') and a position in which it is completely removed from obscuring the image sensor ('night mode'). This on-or-off approach is believed to be the most common approach in commercially available products, though the approach does have some accompanying artifacts. When switching from night-mode to day-mode it is not uncommon that the light level with the IR-filter in the beam path is too low, and that a switch back to night-mode is necessary, resulting in a back-and-forth flickering between night-mode and day-mode. There is also considerable wear on the actuator. A current solution would be to add a light sensor, so that it may be deduced that the light level is acceptable prior to effecting the switch. In patent literature, there are examples of more elaborate constructions.

In JP patent publication No. 2006078666, an arrangement where the IR-filter is arranged adjacent to a diaphragm (an iris diaphragm) is disclosed. The IR-filter has a radially non-uniform transmission profile where the center of the filter has essentially no transmission while the transmission increases with the radius (not necessarily in a linear fashion). The IR-filter is arranged concentrically with an optical axis, which is also the case for the diaphragm. The consequence is that when there is an abundance of ambient light and the diaphragm has a very small opening, the IR-component will be removed from all radiation passing the diaphragm and reaching the image sensor. As the amount of ambient light reduces, it will be possible to switch to night mode by simply increasing the size of the diaphragm, reducing the IR-attenuating portion to a minor portion of the diaphragm opening.

There is an added benefit in having the filter close to the plane of the diaphragm (referred to as aperture plane in the following), since in a normal configuration the aperture plane represents a position where there is no spatial correlation with the plane of the image sensor. Sometimes this is referred to as the aperture stop, wherein the aperture stop limits how much light from each point of the object that reaches a conjugate image point (the sensor in our case). Aperture stop thus defines a plane in the beam path, and sometimes the term "aperture plane" is used for the same feature. A feature of this plane is that it is a position in which alterations in a size of a diaphragm aperture will affect the entire image plane equally, at least in an ideal situation.

The disclosed teachings mainly relate to improvements in IR-filter control.

SUMMARY

In an effort to provide improvements in IR-filter control, it is an object of the disclosure to provide a method for sequential control of a diaphragm arrangement of a camera having an image sensor, the arrangement comprising a diaphragm and an integrated IR cut filter in a first aspect. The method comprises initiating closing or opening of the diaphragm having an initial aperture opening and detecting an amount of incident radiation when the diaphragm has the initial aperture opening. The method then proceeds to shifting the aperture opening of the diaphragm to an intermediate aperture opening in order to alter the ratio between visible light and infrared radiation passing the diaphragm. The method may herein be adapted for a closing or an opening motion of the diaphragm, in that if closing of the diaphragm is initiated, performing a predetermined partial closing of an aperture of the diaphragm, or if opening of the diaphragm is initiated, performing a predetermined partial opening of the aperture of the diaphragm. The partial opening or closing is followed by detecting an amount of incident radiation following the shift of the aperture opening, and calculating a composition of visual light and infrared radiation in the scene from the detected amounts of incident radiation and a calculated ratio between visible light and infrared radiation when having the initial aperture opening and the intermediate aperture opening, respectively. As a final measure the aperture opening of the diaphragm may be shifted to a new position. The calculation may also result in that it is deemed that a shift is inappropriate given the present ambient conditions, in which case a new initiation may be performed at a later time. The diaphragm is preferably arranged as an aperture stop in the aperture plane, or as close as possible.

"As close as possible" refers to that it may be physically impossible to arrange the diaphragm exactly in the aperture plane, due to structural constraints, and that the effects associated with the aperture plane may be accomplished, to an adequate extent, along a small length of the beam path rather than in a discrete location.

The disclosed method enables estimation of a ratio between visual light and infrared radiation using a sensor which does not by itself discriminate between the two. As such, it enables prediction of the consequences of adjusting the aperture opening to a new setting. In a specific embodiment, it enables a shift from day-mode to night-mode, or vice versa, having a high success rate, which consequently reduces the artifacts present in present techniques.

It may, in one or more embodiments, be preferred that an initiation of the closing of the diaphragm [aperture] is triggered by a timer. In this way, the setup will check every now and then if the consequences of a shift would be beneficial from an image quality, or surveillance, standpoint. Following the method down to, but not including, the actual shift would take fractions of a second, and it would not be visible for an operator due to the mere speed of the process. To further reduce the risk of causing any unwanted effects, the setup may, in some embodiments, be arranged to hide the image frames generated during the control phase of the method, (i.e., at least up to the actual shift).

In variations of this embodiment, the timer may be arranged to output a trigger signal or initiation signal periodically, preferably at regular intervals, such as once every ten seconds, once every minute, once every two minutes. The time between trigger signals may vary. For instance, the addition of an internal clock, (i.e., that the timer includes data concerning time of day, daylight statistics, and the like), may be used to vary the activity of the timer output. This is most readily explained in connection with a shift from night-mode to day-mode, in which it would make little sense to output a trigger signal every ten seconds during the night, unless there is an ambient source of light present. The timer could then be configured to alter intervals depending on the time of day, in the most simplistic example.

The predetermined partial opening or closing of the aperture may be configured to result in a change of relative intensity on the order of less than 30%, preferably less than 20%, and suggestively in the order of 10%. There is a balance between obtaining reliable statistics and performing the method swiftly.

As such, the method will enable detection of incident radiation using a single image sensor, meaning that a regular camera setup could be utilized, without the addition of auxiliary sensors.

When detecting the incoming radiation, one may utilize smaller portions of the image sensor, while in other embodiments deducing a mean composition or global composition of visual light and IR radiation in the imaged scene when calculating the composition will be the preferred mode of operation, which may give more reliable statistics. It will of course always be possible to combine the two, or extract both types of information, if desired.

In a second aspect, the present disclosure provides an assembly comprising a camera, a camera controller, a camera lens and a diaphragm arrangement for controlling the amount of radiation reaching an image sensor of the camera, wherein an IR cut filter is integrated in the diaphragm arrangement. The assembly may be configured to perform the method according to one or any of the embodiments provided above or below, and thus it will include the corresponding effects. It is preferable that the diaphragm arrangement is positioned in the aperture stop of the assembly.

In more refined embodiments, the assembly may in an addition to the IR-cut filter comprise a further filter in the form of a dual bandpass filter transmitting visual light and radiation in a spectral region including the spectral region of an IR-illumination source while blocking other wavelengths in the infrared region. The dual bandpass filter may be fixedly arranged, meaning that it always will block the beam path from a scene to the image sensor. Such an arrangement may facilitate transition between day mode and night mode and as such it enables such transition without use of a regular movable IR-cut filter and consequently one moveable part is removed from the arrangement. In one or more embodiments both the fixedly arranged band-pass IR filter and the IR-cut filter transmit light in the visual region, thus enabling larger amount of radiation reaching the image sensor. In a pure night mode only the dual bandpass filter will block radiation from the scene, while in a pure day mode both filters will block the radiation from the scene. The behavior of the filters in spectral regions outside of the spectral response of the image sensor is of less importance, since radiation outside this spectral region will not be detected.

For a swift control and actuation of the method the diaphragm may comprise at least two diaphragm blades, wherein the IR cut filter is arranged on at least one of the diaphragm blades.

In an alternative set of embodiments, the IR cut filter may instead be arranged adjacent to the diaphragm and have IR-cut properties in a central portion thereof, while not radially outside of the central portion. The effects of this arrangement are thoroughly described in the detailed description.

According to a third aspect, the present disclosure relates to a computer readable medium containing program instructions for causing a camera processor to perform the method of any embodiment.

A further scope of applicability of the present teachings will become apparent from the detailed description given below. However, it should be understood that the detailed description and specific examples, while indicating preferred embodiments, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

A more detailed understanding may be had from the following description, given by way of example in conjunction with the accompanying drawings where.

Figure 1:
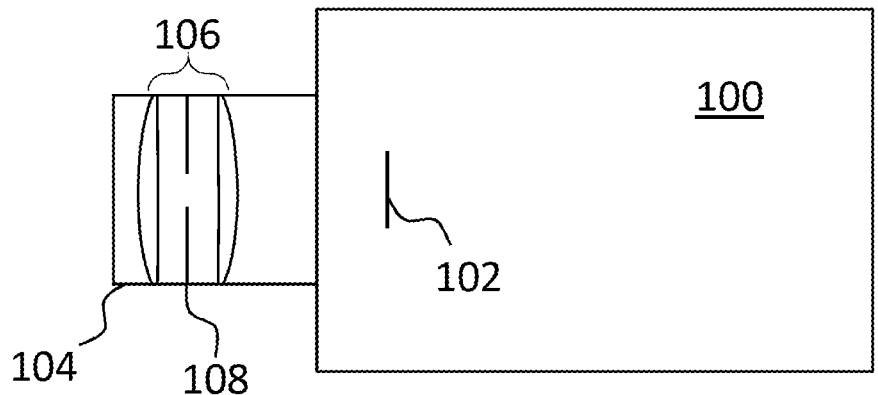
FIG. 1 is a schematic view of a camera setup.

Throughout the drawings, like components have been given like reference numerals, only differing in an identifier relating to the number of the drawing. The similarity between drawings will enable a reader to readily understand the different drawings, thus making an excessive use of reference numerals superfluous.

DETAILED DESCRIPTION

FIG. 1 is a schematic view illustrating a setup in which the present arrangement and method may form a part. What is illustrated is a camera 100, such as a video camera having an image sensor 102 and a camera lens housing 104. The camera lens housing 104 of the illustrated example has a standard layout with a lens system 106 and a diaphragm 108. This is obviously a very simplistic description of a camera lens housing, but considered sufficient for the purposes of the present application.

The diaphragm 108 is placed in the aperture stop of the lens system 106 (or as close to the aperture plane as physically possible). For an ideal single-lens system the aperture stop would be positioned in the middle of the lens, orthogonally to the optical axis. Further to what has already been said, the features of the aperture stop imply that the size of the diaphragm will only affect the amount of light reaching the image sensor 102, not the actual image. More specifically it will not generate any shadowing or similar effects or artifacts in the image plane, (i.e., in the plane of the image sensor). For this reason it is standard practice to position the diaphragm (the aperture) in the aperture stop.

By controlling the size of the opening of the diaphragm it is possible to control the amount of radiation reaching the sensor, which of course is well known from regular iris diaphragms used in cameras.

Figure 2:
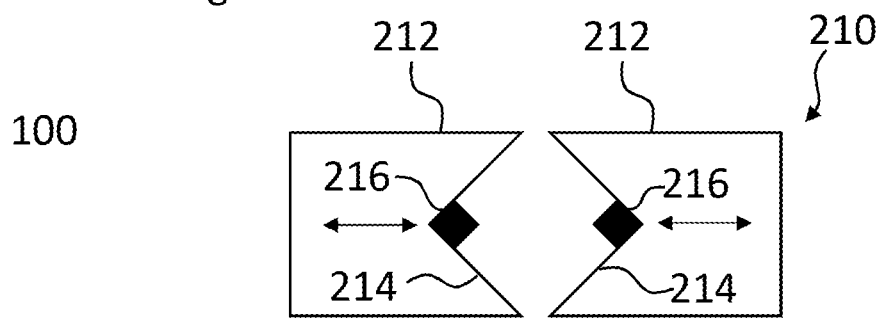
FIG. 2 is a schematic view of a diaphragm which may be used in embodiments.

A diaphragm 210 according to a first embodiment is illustrated in FIG. 2, and while the actual design may differ significantly, FIG. 2 is believed to describe the function to a satisfactory extent. The diaphragm 210 comprises two diaphragm blades 212, each having a triangular cutout 214. The arrows on each blade illustrate how they can move back and forth, preferably in a synchronized manner, which will lead to a variation in the size of the diaphragm aperture defined by the triangular cutouts in combination.

According to a first embodiment, IR-filters 216 are arranged in the apex of each triangular cut-out. In the illustrated embodiment the filters have been given a square shape, but the shape may differ. Furthermore, the shape of the cutouts 214 may differ. To some extent the shape of the cutout may be very freely designed, and different manufacturers provide different shapes. A common feature may be that as the diaphragm blades close, the formation of a slit-shaped aperture should be avoided, since this could result in unwanted effects. The shape of the filter or filters would obviously be adapted to the shape of the corresponding cutout. Returning to the IR-filters they are IR-cut filters, allowing transmission of visible light while preventing transmission of infrared radiation. It is apparent that when the diaphragm is open to the extent illustrated in FIG. 2, both visual light and IR-radiation will pass through the diaphragm aperture. Furthermore, it is readily appreciated that as the size of the diaphragm aperture is decreased, a point will be reached where the aperture is fully covered by IR-filters, thus allowing transmission of visual light only. Ranging from this point and downwards (i.e., towards smaller apertures) the IR-filters will cover the aperture completely and the range is thus suitable for conditions where there is an abundance of ambient light, for example, during daytime.

Consider that the full area defined by the combination of the cutouts will allow for transmission of visual light, while transmission of IR-radiation will be defined by the full area minus the area occupied by filters. Consequently, an effective aperture size will vary for the two wavelength regions. More specifically the area occupied by the filters is constant (disregarding any overlap in the illustrated embodiment), meaning that the ratio between visual light and IR-radiation will vary with the position of the diaphragm, (i.e., the size of the diaphragm aperture). Both the transmitted visual light and the IR-radiation will vary proportionally to the size of the aperture, but at different rates since they will have different effective apertures, and consequently the ratio between IR-radiation and visual radiation will vary.

Figure 9:
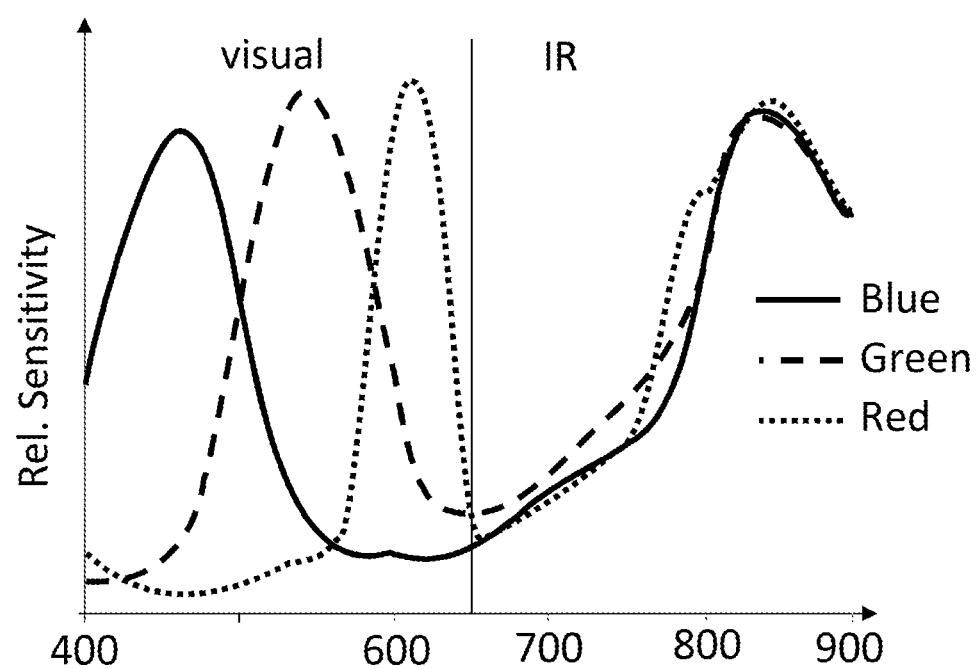
FIG. 9 is a graph showing that an image sensor and associated components sort incoming radiation into red, green and blue components, each of the color components including an IR component.

If the transmitted radiation were fully spectrally resolved it would be readily possible to monitor and evaluate the proportions, but it should be noted that generally the image sensor and associated components will at the most sort the incoming radiation into red, green and blue components, each of the color components including an IR component (which is indicated in FIG. 9), so as to be able to regenerate a color image, and it is generally not possible to isolate the infrared component at all. Image sensors enabling such spectral resolution have been disclosed in patent literature and the image sensors include NIR pixels, yet the cost for such image sensors are significantly more expensive at the present time. Further, the NIR pixels are included in the sensors at the expense of loss in resolution, most often in the green color component.

While the IR-cut filter is arranged in the aperture plane, other filters may be positioned in front of the sensor or even in front of the lens, one reason being that certain filters are changed depending on ambient light conditions and effects (such filters are typically arranged in front of the lens, or attached thereto), or that the filter is not considered to be removed or exchanged, or that control is performed by a separate actuator (in the case of filters arranged immediately in front of the image sensor).

Returning to FIG. 2 it should be apparent how the diaphragm 210 of the present embodiment may shift between a pure day-mode, where IR-radiation is fully blocked, and a night-mode, where transmission of IR-radiation to the image sensor is allowed. It should also be straightforward to realize how the size of the aperture may be varied, both within the day-mode and the night-mode in order to deduce, for example, the amount of IR-light present in the scene.

In the traditional solution, a movable IR-cut filter is arranged in front of the image sensor in the day-mode and removed from the beam path in the night-mode. Therefore, in the traditional solution, the diaphragm aperture may be varied over an equal range in both the day-mode and the night-mode, since its function is isolated from the function of the filter, although in a practical situation the diaphragm is fully opened in night-mode. In contrast, for the present embodiments, the size of the filters 216 will affect how much the diaphragm may be opened before IR-radiation will start to be transmitted through the diaphragm aperture. For that reason, embodiments may have to switch to night-mode, (i.e., producing black and white images), earlier than what would have been the case in a traditional solution.

The reason is that introduction of IR-radiation to the image sensor will distort the color correction performed by the camera controller, since IR-radiation will affect all pixels (referring to FIG. 9), and an IR-filter is necessary to be able to provide a true color representation. Therefore, night-mode is generally presented in black and white only (only displaying intensity information rather than spectral information). For the present disclosure, according to some embodiments thereof, a range of intermediate states may exist between day-mode and night-mode. In these intermediate states the color correction algorithm is maintained, even though the displayed colors may be skewed. A user may choose the amount of distortions that may be considered acceptable and when a switch to true day-mode or true night-mode should be performed. Information of color differences may be valuable for a user, depending on the surveillance situation, even if the colors are skewed.

Figure 3:
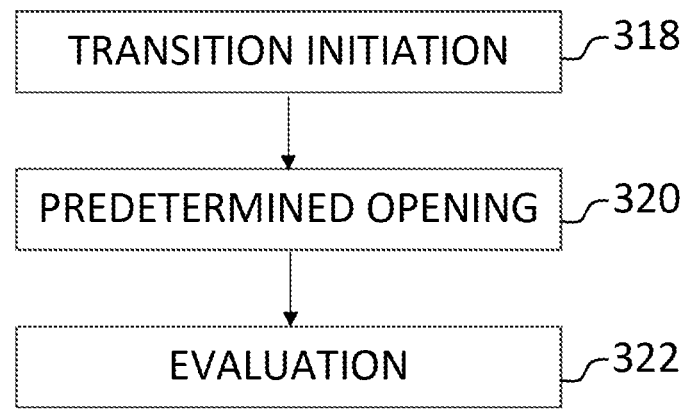
FIG. 3 is a flowchart outlining the main steps according to one or more embodiments.

The paragraphs above only describe a set-up enabling the present teachings. In the following paragraphs, a method according to a first embodiment will be disclosed, referring to FIGS. 3, 4, and 5. FIG. 3 is a flowchart of the method, and FIGS. 4 and 5 are views illustrating two diaphragm settings and the associated transmitted radiation as a function of wavelength. The graphs are qualitative rather than quantitative. FIG. 4 illustrates a portion of a method for transition from day-mode to night-mode, while FIG. 5 illustrates a portion of a method for transition from night-mode to day-mode.

Figure 4A:
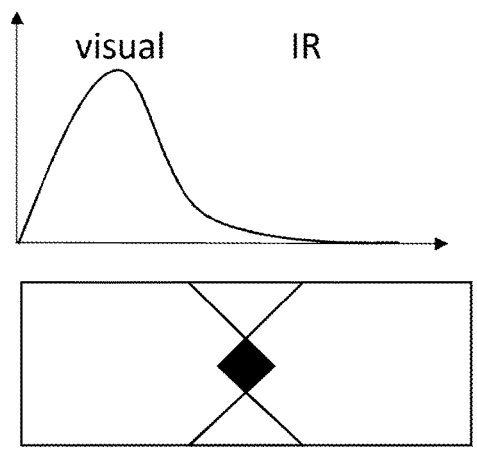
FIGS. 4a,b and 5a,b are combination views illustrating actual steps in the method of FIG. 3.

In a first step 318 it is decided that a transition between modes may be required and a transition may be initiated. When performing transition from day-mode to night-mode (FIGS. 4a and 4b) the decision may be based on an actual measurement of image sensor response, the amount of noise, gain settings, and the like, (i.e., parameters indicating that the ambient light level is insufficient for the day-light mode). A pure day-light mode is illustrated in FIG. 4a, having the IR-cut filters covering the diaphragm aperture completely (lower left) and the transmitted radiation residing in the visual wavelength region only.

Figure 4B:
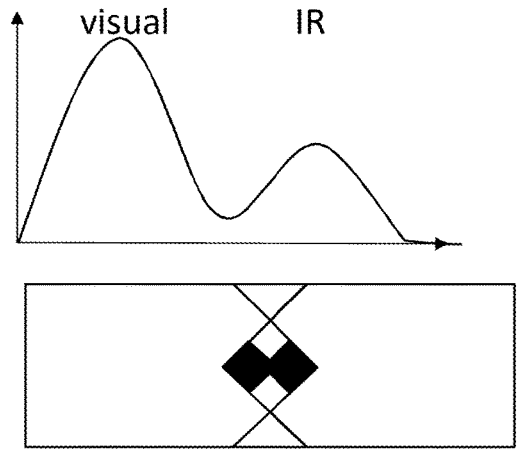

In a second step 320, the diaphragm aperture is opened by a predetermined amount (lower portion of FIG. 4b) resulting in that the transmitted radiation starts to include wavelengths in the infrared wavelength region, as indicated in the graph of FIG. 4b.

In a third step 322 the effects of the predetermined opening is evaluated. By evaluating the effects of the predetermined opening it will be possible to deduce the appropriate diaphragm aperture for the particular present situation, or merely if it would be suitable to perform a full transition between modes (day/night) or not. Furthermore, it is possible to deduce whether an IR-radiation source, for example, an IR-LED illuminator (internal or external), should be actuated in order to improve the imaging situation.

The IR-LED illuminator could be included in the camera or provided by an external lighting source. Combinations of internal and external lighting arrangements may also be used.

Following the evaluation it will be possible to configure the camera setup in a suitable way, and in particular the settings of the diaphragm aperture, and the default action would be to switch to night-mode if considered appropriate. With the present teachings, it will be possible to deduce if the IR-radiation present in the scene will suffice for imaging purposes or if actuation of an IR-illuminator is appropriate. Furthermore, other settings such as gain and exposure time could also be deduced.

It is noted yet again that the spectrally resolved information is not available, the image sensor may only detect an intensity. The intensity may be spatially resolved however, although a mean value or total value over the entire image sensor may give more reliable statistics, and finding minimal and maximal intensity may also provide critical information. By knowing the properties of the diaphragm it is known, however, how much the area transmitting visual light has increased, and how much the area transmitting IR-radiation has increased (basically from 0 to something else in the example of FIG. 4).

Figure 5A:
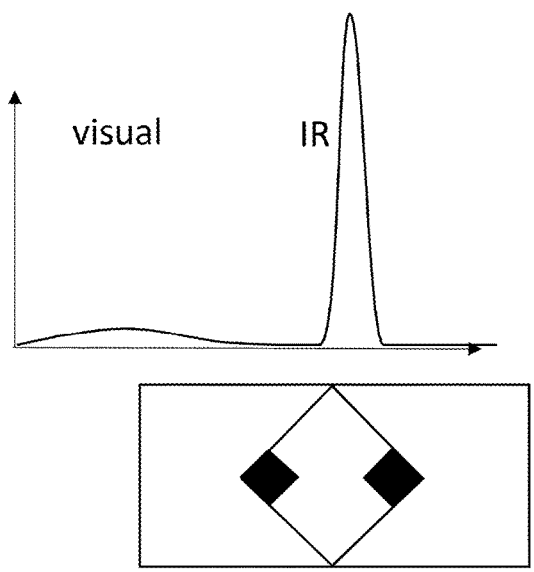

The transition from day-mode to night-mode is easier than the other way around, since when the lighting situation is insufficient, the switch essentially has to be made. For that reason, the present teachings have more apparent advantages in a transfer from night-mode to day-mode, which will be described referring to FIG. 5. In FIG. 5a, the night-mode is illustrated. The diaphragm is almost fully opened, allowing transmission of IR and visual light, where the IR may be enhanced by use of an IR illuminator and the visual light component is naturally low due to the circumstances. When in night-mode, and in particular if an IR-illuminator is used, it may be difficult to assess a suitable time for a transition to day-mode. Application of the present teachings for the situation of FIG. 5 will be analogous to the application described referring to FIG. 4; in the first step it is decided that a transfer between modes may be desirable. It is noted that this may require a slightly more elaborate decision process than what was the case for the embodiment of FIG. 4. The cause of this is that when in night-mode, in particular if an IR-illuminator is used, the conditions will not change significantly if the ambient light increases. Instead, the decision has to be supported by a concrete action. A first approach could be to flicker the IR-light source to deduce the effect of that. An alternative for addressing the issue could be to base the initiation of the disclosed method on a more or less elaborate timing device. The timing device could initiate the method at certain intervals. The interval between initiations could be equally spaced, or correlated to the time of day and/or the date.

Figure 5B:
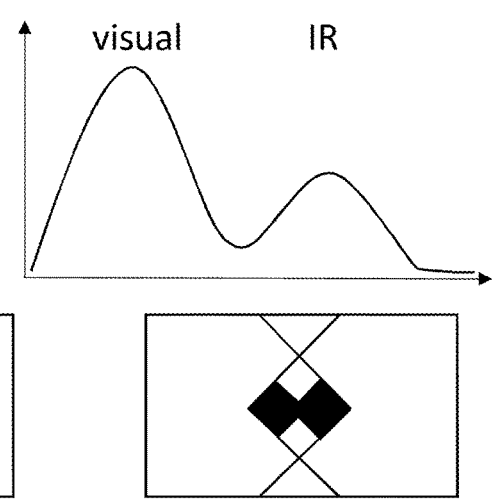

The diaphragm aperture may in the second step be closed to a first predetermined state, shown in the lower portion of FIG. 5b. At this point the amount of transmitted IR-radiation will have been reduced to a higher extent than the amount of visual light, which is illustrated in the shift of ratio obvious in the graph of FIG. 5b. Knowing how much the IR-transmitting diaphragm area and the visual-transmitting diaphragm area has changed makes it possible to deduce a suitable setting for the diaphragm aperture, and more particularly it will render it possible to deduce if a transfer from night-mode to day-mode may be performed with any hope of success in terms of adequate image quality.

Consider in the example that the aperture size is altered between a first aperture setting where 100% of the aperture is covered by the IR-filter (day mode) and a second aperture setting where 90% of aperture is covered by the IR-filter. By use of the present teachings, it will be possible to calculate the ratio between IR-radiation and visible light by using known parameters, or parameters that may be measured using the camera sensor:

$$\frac{Z_2}{Y_2} = \frac{X_2 - \frac{A_2}{A_1} * X_1}{\frac{A_2}{A_1} * X_1}$$

A1: The area of the first aperture opening (known)
X1: The first total intensity (IR and visible as measured by image sensor)
A2: The area of the second aperture opening (known)
X2: The second total intensity (IR and visible as measured by image sensor)
Y2: Intensity of visible light in second aperture position
Z2: Intensity of IR radiation in second aperture position The actual equation and the parameters used as input may of course be different depending on the setup.

From the equation it will be possible to deduce the size of the visual-light component, and if that component is considered to be sufficient for imaging purposes, a switch to day-mode will be performed.

Apart from the parameters of the equation, an evaluation deducing if a switch is appropriate or not would also include gain settings (current and possible), exposure time settings (current and possible) as well as other parameters that could affect the resulting image quality and the decision to perform a mode switch.

The present teachings may be used in different configurations. For example, one application may be configured to utilize the disclosed method (according to any of its embodiments) in a transition from night-mode to day-mode, yet not the other way around. This may be useful in situations where an IR illuminator is used, since then it is known that there will be plenty of IR radiation in the scene. In another application, the disclosed method (according to any of its embodiments) is used in a transition from day-mode to night-mode, yet not the other way around. In still further applications, the disclosed method is used for both types of transitions, and in an alternative the utilization is user defined, such that for a specific application a user may select for which transitions the disclosed method should be activated.

Figure 6A:
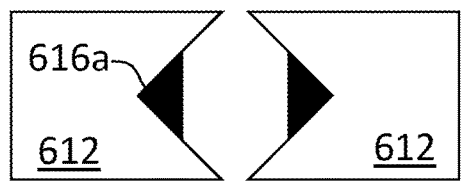
FIGS. 6a and 6b are views of diaphragm/filter combinations which may be utilized for the purposes of enabling one or more embodiments.
Figure 6B:
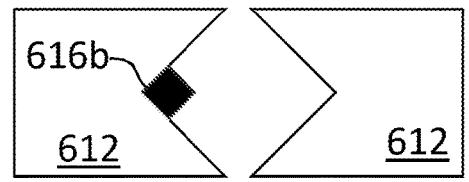

FIGS. 6a and 6b are views of some alternative embodiments for the diaphragm and filters. In FIG. 6a a filter 616a having triangular cross section is arranged on each blade, enabling a complete IR-block without overlapping filters, and in FIG. 6b there is a single filter 616b arranged on one of the blades enabling IR-block and varying aperture size without any filter overlap.

Figure 7A:
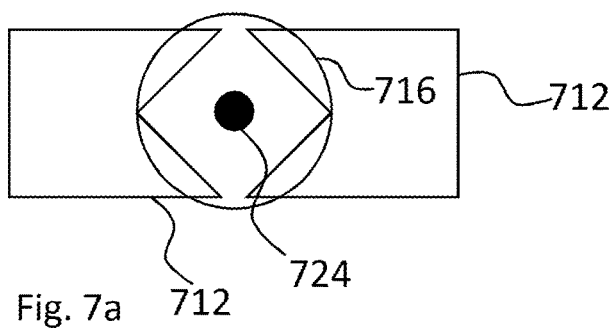
FIGS. 7a and 7b are views of further combinations of diaphragm/filter combinations which may be utilized for the purposes of enabling one or more embodiments.
Figure 7B:
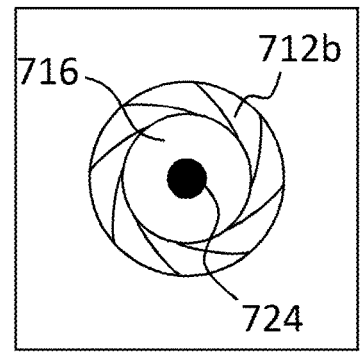

FIG. 7a illustrates an alternative to including the IR-cut filter in the diaphragm blades, namely to have an IR-cut filter 716 with varying spectral transmittance over its surface. In the illustrated example the IR-cut filter is only a true IR-cut filter in a central portion 724 thereof, while the rest of the filter 716 transmits both visual light and IR-radiation. Arranging such an IR-cut filter fixedly in or near the plane of the diaphragm enables use of a method according to the already disclosed embodiments. Embodiments where the IR-cut filter is included in a diaphragm arrangement rather than in a diaphragm blade enable use of more elaborate diaphragm constructions. An example is a combination with an iris diaphragm 712b, as shown in FIG. 7b.

Throughout the drawings, like components have been given like reference numerals, only differing in an identifier relating to the number of the drawing. The similarity between drawings will enable a reader to readily understand the different drawings, thus making an excessive use of reference numerals superfluous.

A common feature regarding the behavior of the diaphragm arrangement in the disclosed embodiments is that the ratio between IR-radiation and visual light transmitted through the arrangement will vary over the range of aperture openings possible. The smaller the opening, the smaller the ratio (i.e., the visual portion will increase) to a point where essentially no IR-radiation is transmitted (the attenuation will be limited by the properties of the IR-cut filter) and the ratio basically is zero. The ratio will increase with the size of the aperture opening, but it will never reach 1, since there will always be a portion of the aperture opening being covered by the IR-cut filter. Also, the aperture opening will have a region where there is essentially no IR-light, and therefore there will be an interval close to a fully closed position where the ratio is constant. The size of this interval will be affected by the size of the IR-cut filter.

Figure 8:
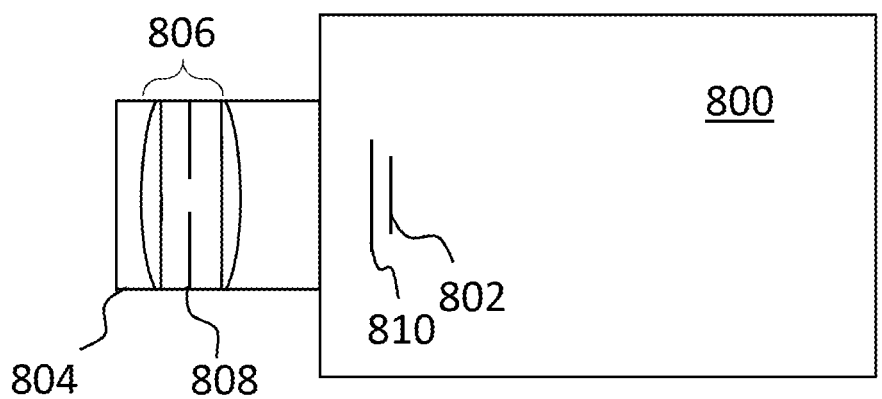
FIG. 8 is a schematic view of a camera setup according to a further embodiment.

Returning to the problem mentioned earlier, that the embodiments disclosed thus far may necessitate that a transition from day-mode to night-mode has to be done earlier than for a traditional configuration where a movable IR-cut filter is arranged in front of the image sensor, a possible solution will now be discussed. In an effort to eliminate or alleviate that effect, an arrangement as illustrated in one of the embodiments above may be supplied with an additional IR-filter 810, as shown in FIG. 8. The additional IR-filter should be a dual bandpass filter, allowing transmission of visual radiation and of a wavelength region corresponding to the emission of an IR illuminator used for illumination of the scene, but not for other IR-wavelengths regions. This dual bandpass filter is arranged fixedly in the beam path, for example in front of the image sensor, or as a retrofittable filter arranged on the lens housing, but it may obviously be positioned in other positions instead. This embodiment will enable a slightly different approach, which may be appreciated when studying FIG. 4b. In the embodiment of FIG. 4b the significant contribution in the IR-region may distort the color representation, necessitating a transition to black and white night-mode. For the present embodiment, however, the IR contribution will only correspond to a narrow wavelength region, which enables more dynamics in day-mode. An effect is that an IR-radiation source may be required in night-mode due to the narrow spectral response region.

The disclosed method may be effected by merely using a sum of the signal from the entire image sensor. Forming the ratio between the original image and the image in which the diaphragm is moved to the predetermined position enables the formation of a system of equations. The solution of the system of equations is straightforward and it reveals the parameters that in turn enable prediction of a success rate before transition from night-mode to day mode and vice versa, and when deducing whether additional illumination should be utilized or not. This is good in itself, but other disclosed embodiments may result in further benefits.

What is claimed is:

1. A method for sequential control of a diaphragm arrangement of a camera having an image sensor, the arrangement comprising a diaphragm arranged as an aperture stop, and an integrated IR cut filter always covering at least a portion of an aperture opening of the diaphragm, the method comprising:

initiating closing or opening of the diaphragm having an initial aperture opening;

detecting an amount of incident radiation when the diaphragm has the initial aperture opening;

shifting the aperture opening of the diaphragm to an intermediate aperture opening in order to alter the ratio between visible light and infrared radiation passing the diaphragm, by means of:

if closing of the diaphragm is initiated, performing a predetermined partial closing of an aperture of the diaphragm by which the ratio of visible light to infrared radiation will increase, or if opening of the diaphragm is initiated, performing a predetermined partial opening of the aperture of the diaphragm by which the ratio of visual light to infrared radiation will decrease;

detecting an amount of incident radiation following the shift of the aperture opening;

calculating a composition of visual light and infrared radiation in the scene from the detected amounts of incident radiation and a calculated ratio between visible light and infrared radiation when having the initial aperture opening and the intermediate aperture opening, respectively; and shifting the aperture opening of the diaphragm to a new position.

2. The method of claim 1, wherein the sequential control is performed in a shift from a day-mode to a night-mode, or vice versa.

3. The method of claim 1, wherein closing of the diaphragm is triggered by a timer.

4. The method of claim 3, wherein the timer includes data concerning time of day and daylight statistics.

5. The method of claim 3, wherein the timer outputs a trigger signal periodically.

6. The method of claim 1, wherein said predetermined partial opening or closing of the aperture is configured to result in a change of relative intensity on the order of less than 30%, preferably less than 20%, and suggestively in the order of 10%.

7. The method of claim 1, wherein the camera comprises a single image sensor, and wherein the detection of incident radiation is performed using the single image sensor.

8. The method of claim 1, further comprising deducing a mean composition or global composition of visual light and IR radiation in the imaged scene when calculating the composition.

9. An assembly comprising a camera, a camera controller, a camera lens and a diaphragm arrangement for controlling the amount of radiation reaching an image sensor of the camera, wherein an IR cut filter is integrated in the diaphragm arrangement, wherein the assembly is configured to perform the method according to claim 1.

10. The assembly of claim 9, further comprising a further filter, wherein the further filter is a dual bandpass filter transmitting visual light and radiation in a spectral region including the spectral region of an IR-illumination source, while blocking other radiation in the IR.

11. The assembly of claim 9, where the diaphragm comprises at least two diaphragm blades, and wherein the IR cut filter is arranged on at least one of the diaphragm blades.

12. The assembly of claim 9, wherein the IR cut filter is arranged adjacent to the diaphragm and has IR-cut properties in a central portion thereof, while not radially outside of the central portion.

13. A non-transitory computer readable storage medium having instructions stored thereon for sequential control of a diaphragm arrangement of a camera having an image sensor, the arrangement comprising a diaphragm arranged as an aperture stop, and an integrated IR cut filter always covering at least a portion of an aperture opening of the diaphragm, execution of which by a computing device causes the computing device to perform operations comprising:

initiating closing or opening of the diaphragm having an initial aperture opening;

detecting an amount of incident radiation when the diaphragm has the initial aperture opening;

shifting the aperture opening of the diaphragm to an intermediate aperture opening in order to alter the ratio between visible light and infrared radiation passing the diaphragm, by means of:

if closing of the diaphragm is initiated, performing a predetermined partial closing of an aperture of the diaphragm by which the ratio of visible light to infrared radiation will increase, or if opening of the diaphragm is initiated, performing a predetermined partial opening of the aperture of the diaphragm by which the ratio of visual light to infrared radiation will decrease;

detecting an amount of incident radiation following the shift of the aperture opening;

calculating a composition of visual light and infrared radiation in the scene from the detected amounts of incident radiation and a calculated ratio between visible light and infrared radiation when having the initial aperture opening and the intermediate aperture opening, respectively; and shifting the aperture opening of the diaphragm to a new position.

\* \* \* \* \*